(12) United States Patent
Engel et al.

(10) Patent No.: US 7,748,254 B2
(45) Date of Patent: Jul. 6, 2010

(54) METHOD AND DEVICE FOR CONTROLLING CLOSED PACKAGES

(75) Inventors: Gisbert Engel, Luttum (DE); Andreas Prahm, Barssel (DE)

(73) Assignee: Focke & Co. (GmbH & Co. KG), Verden (DE)

( * ) Notice: Subject to any disclaimer, the term of this patent is extended or adjusted under 35 U.S.C. 154(b) by 559 days.

(21) Appl. No.: 10/597,791

(22) PCT Filed: Feb. 2, 2005

(86) PCT No.: PCT/EP2005/001004

§ 371 (c)(1),
(2), (4) Date: Aug. 8, 2006

(87) PCT Pub. No.: WO2005/078406

PCT Pub. Date: Aug. 25, 2005

(65) Prior Publication Data

US 2007/0157726 A1 Jul. 12, 2007

(30) Foreign Application Priority Data

Feb. 10, 2004 (DE) .................. 10 2004 006 633

(51) Int. Cl.
*G01M 3/04* (2006.01)
(52) U.S. Cl. .............................................. 73/41; 73/45
(58) Field of Classification Search .............. 73/45, 73/45.1, 45.2, 45.3
See application file for complete search history.

(56) References Cited

U.S. PATENT DOCUMENTS

| 3,751,972 | A  | * | 8/1973  | Hass ..................... 73/45.4 |
| 6,167,751 | B1 | * | 1/2001  | Fraim et al. ............. 73/49.3 |
| 6,330,823 | B1 |   | 12/2001 | Raymond |
| 2003/0230135 | A1 | | 12/2003 | McCormick |

FOREIGN PATENT DOCUMENTS

| DE | 1 271 423    | 6/1968  |
| DE | 36 16 472 A1 | 12/1987 |
| DE | 37 25 739 A1 | 2/1989  |
| DE | 39 36 163 A1 | 5/1991  |
| DE | 197 32 580 A1 | 6/1999 |
| DE | 100 01 300 A1 | 7/2001 |
| EP | 1 357 374 A1 | 10/2003 |

* cited by examiner

*Primary Examiner*—Hezron Williams
*Assistant Examiner*—Mark Shabman
(74) *Attorney, Agent, or Firm*—Sughrue Mion, PLLC

(57) ABSTRACT

To test the integrity of packages—cups (11)—a package conveyor (14) is provided, on whose conveying run (17) the cups (11) are positioned at a distance from one another, specifically in a correct formation forming transverse rows (23). In order to form a sealed testing chamber (13) for a group of cups (11) to be tested, a covering hood (19) can be lowered from above onto the package conveyor (14). Together with the covering hood (19), the latter forms a sealed testing chamber (13). A vacuum is produced in the latter, with the consequence that the packages experience deformation, specifically the cups (11) experience deformation of a closure film. Non-sealed cups (11) are identified and separated out.

16 Claims, 6 Drawing Sheets

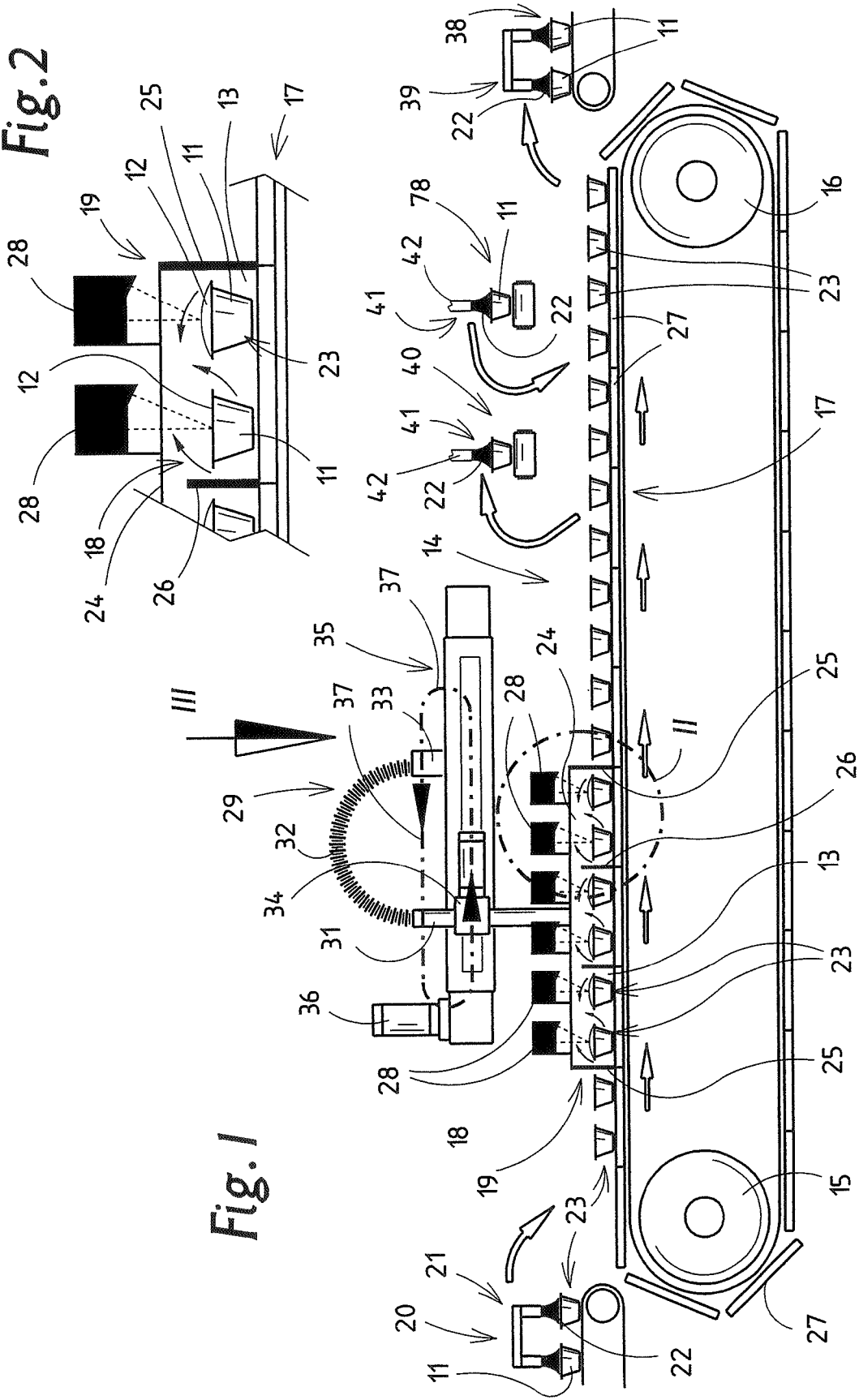

Figure 3:
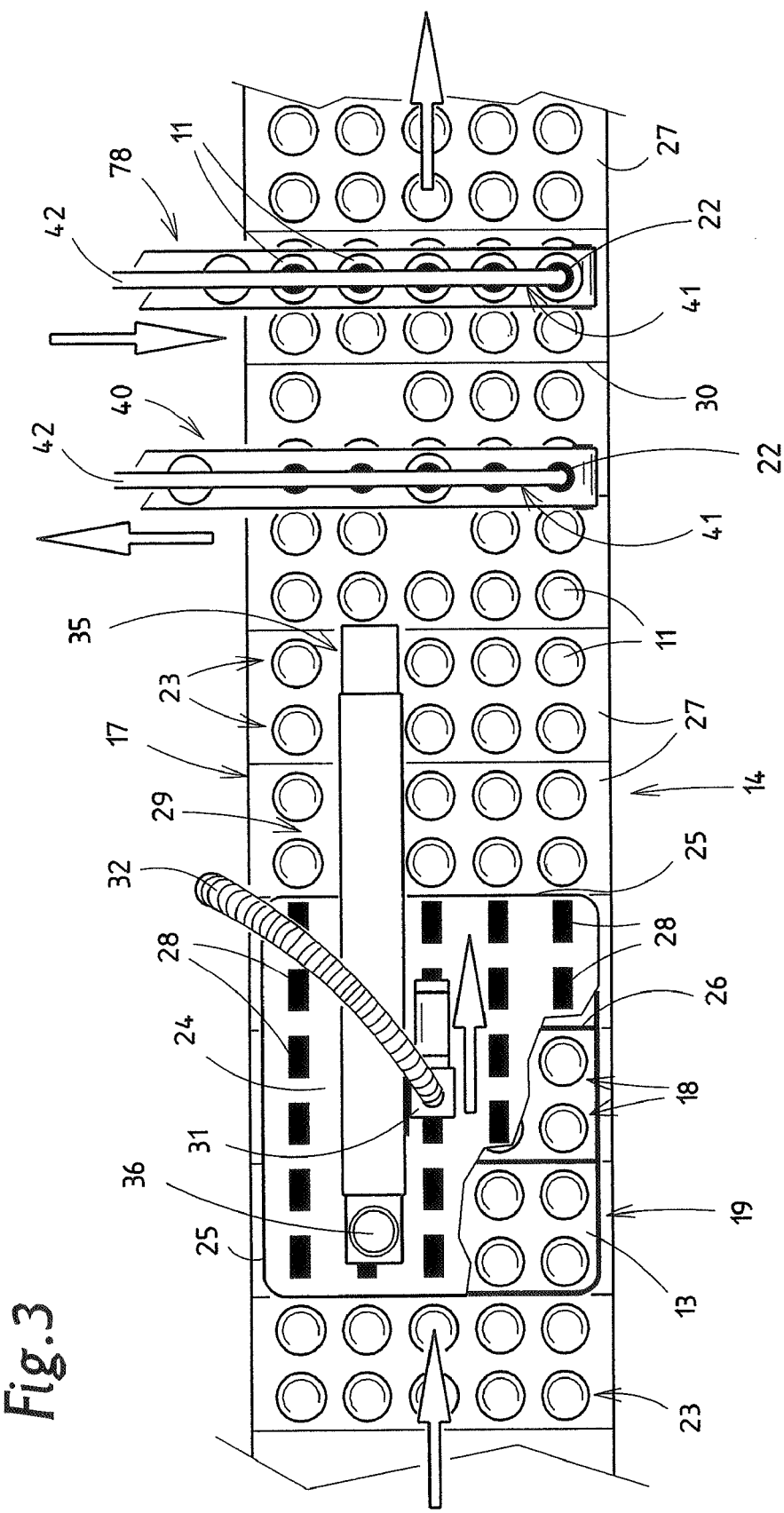

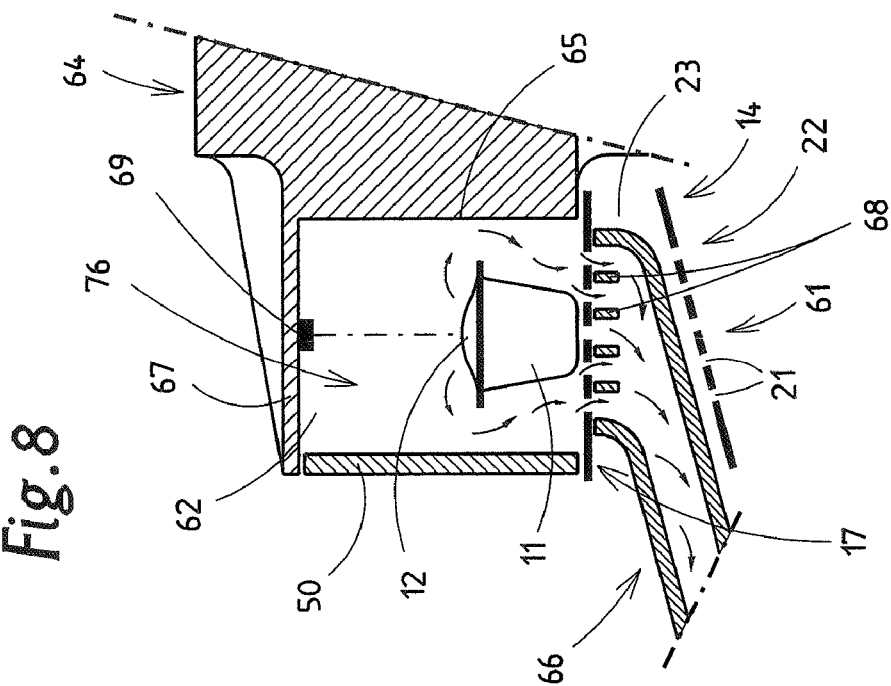
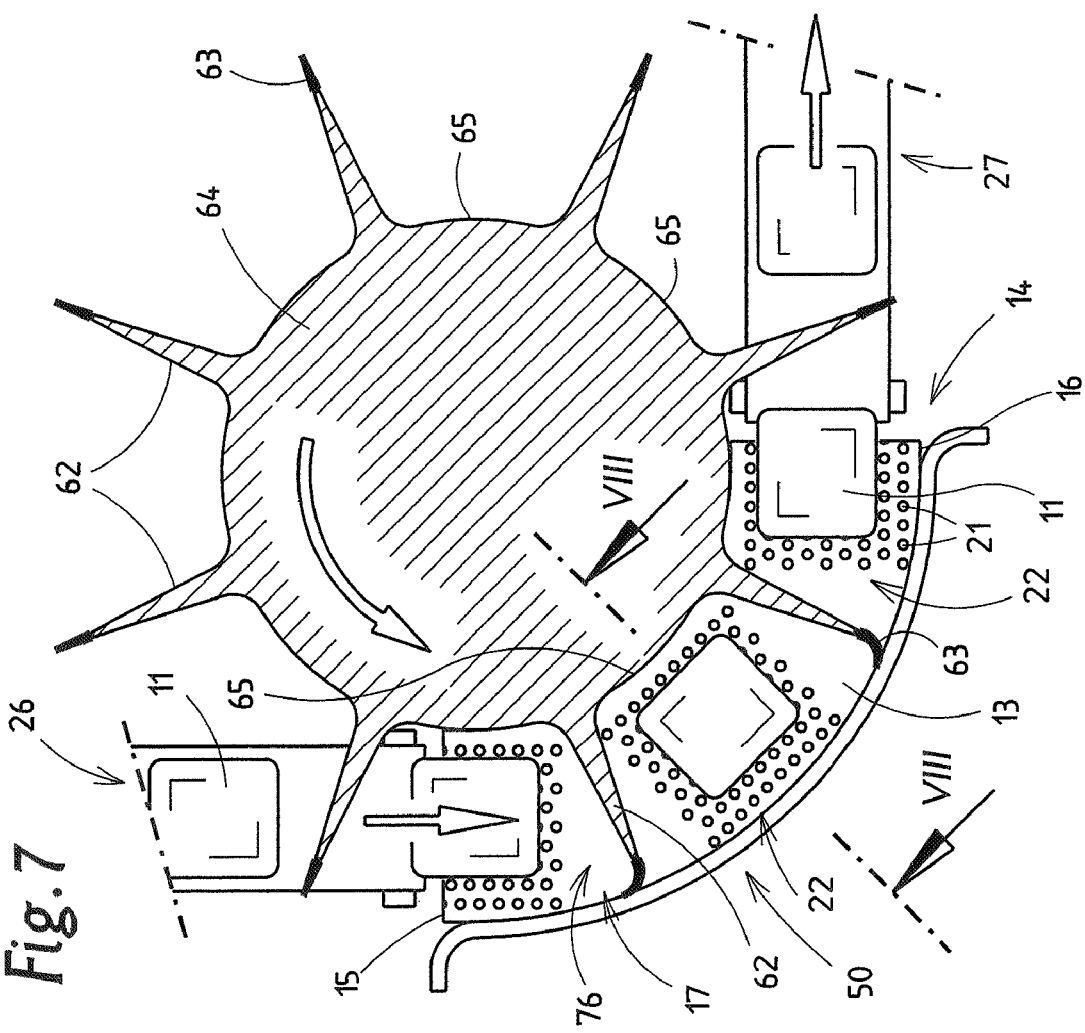

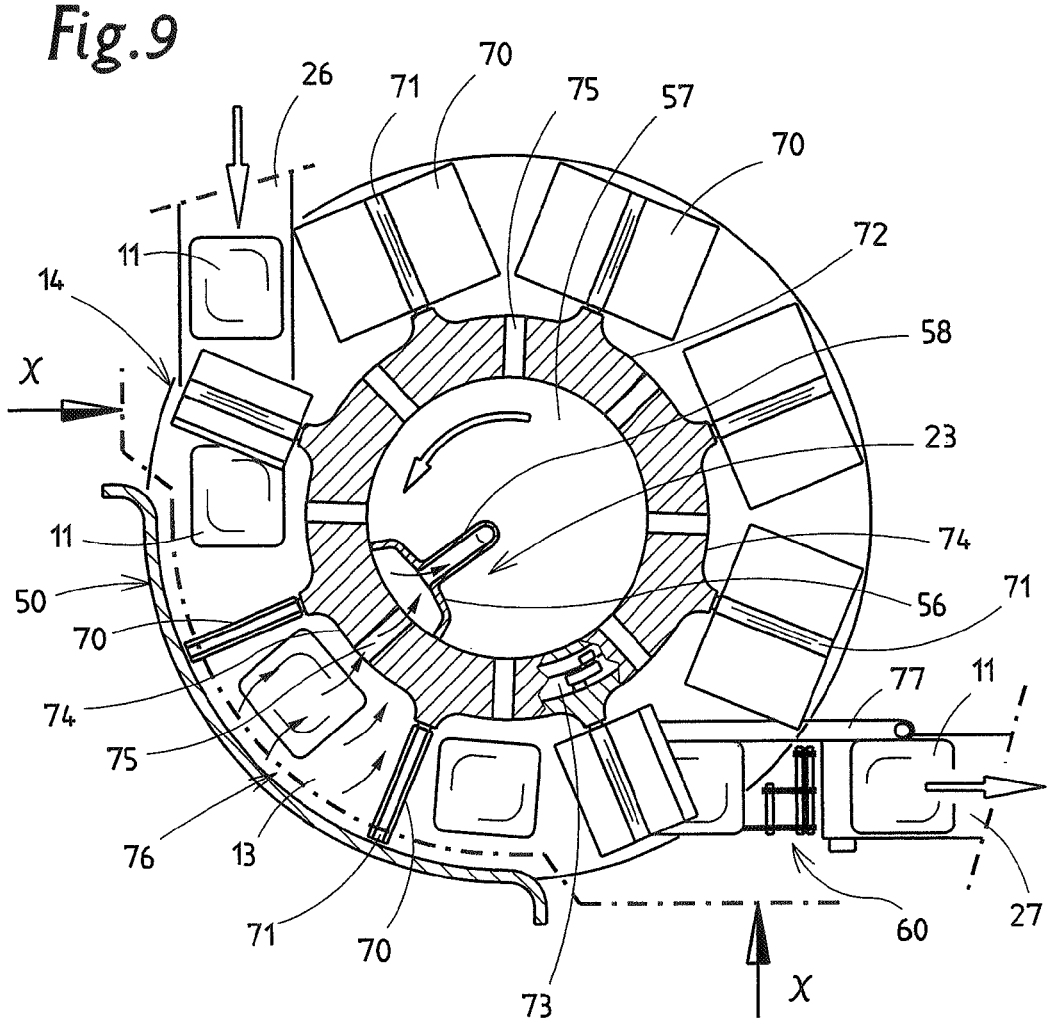
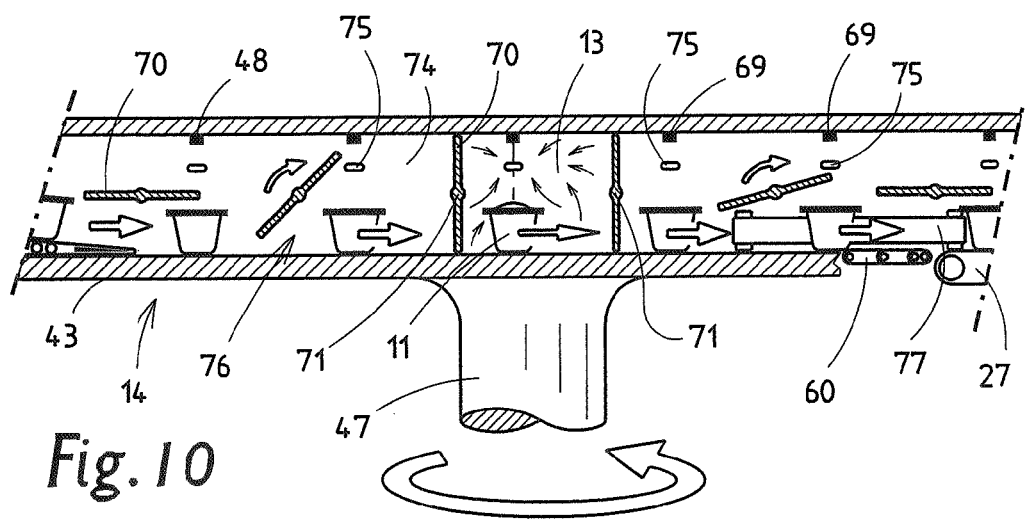

METHOD AND DEVICE FOR CONTROLLING CLOSED PACKAGES

The invention relates to a method for checking the integrity of closed hollow bodies having air inside the same, in particular of closed packages, such as film bags, cup packages with a closure film, etc., by means of vacuum. Furthermore, the invention relates to devices for carrying out the method.

Testing the integrity of packages in the foodstuffs and semi-luxury items industry is important to ensure the keeping properties of the packaged products. This involves packages having a proportion of gas or air in the closed package. Primary examples are film bags and cup packages having a deformable closure film.

Testing such packages by means of a vacuum is known. For this purpose, the package has a vacuum applied to it in a testing device. In the case of a non-sealed closure film, a curvature of the lid is produced, which is identified as an indication of a leak (U.S. Pat. No. 4,934,180).

In the case of the invention, by using a vacuum, improved testing of hollow bodies, in particular of sealed packages of all types having an encapsulation that can be deformed in at least one subregion, is to be provided.

The invention is based on the object of improving the testing of the integrity of packages in particular with the effect that an improved testing performance is achieved and, preferably, the testing method can be integrated into the production process of the objects or packages.

In order to achieve this object, the method according to the invention is characterized by the following features:
a) the articles or packages are preferably transported continuously along a conveying path,
b) during a transport section, the articles or packages are accommodated in a testing chamber running along with the package or with a group of the same to be tested,
c) the testing chamber has a vacuum applied to it in the region of a defined testing section or testing station,
d) the testing chamber is sealed off on all sides, in particular in conjunction with a package conveyor,
e) any deformations of the article or the package in the testing chamber and/or after leaving the same are scanned.

One special feature of the invention is that a possibly relatively large group of packages is tested simultaneously during the transport on a package conveyor. The packages are arranged in an exact, predefined formation, in particular in longitudinal and transverse rows. A testing group built up in this way is checked in a testing chamber formed by a suction bell or by a covering hood in conjunction with the package conveyor. Each package is preferably assigned a sensor, in particular a laser sensor, which scans a testing side of the package in accordance with the triangulation method.

In another embodiment of a device according to the invention, a sealing element can be moved into a testing position in the region of a testing section for the packages and, in conjunction with stationary or movable walls, forms the (sealed) testing chamber.

In the case of the simultaneous testing of a plurality of packages (testing group), according to the invention faulty packages are separated out outside the testing chamber and replaced by fault-free packages, maintaining the formation, so that a complete formation of fault-free packages can be transported onward and, in particular, packed.

Figure 4:
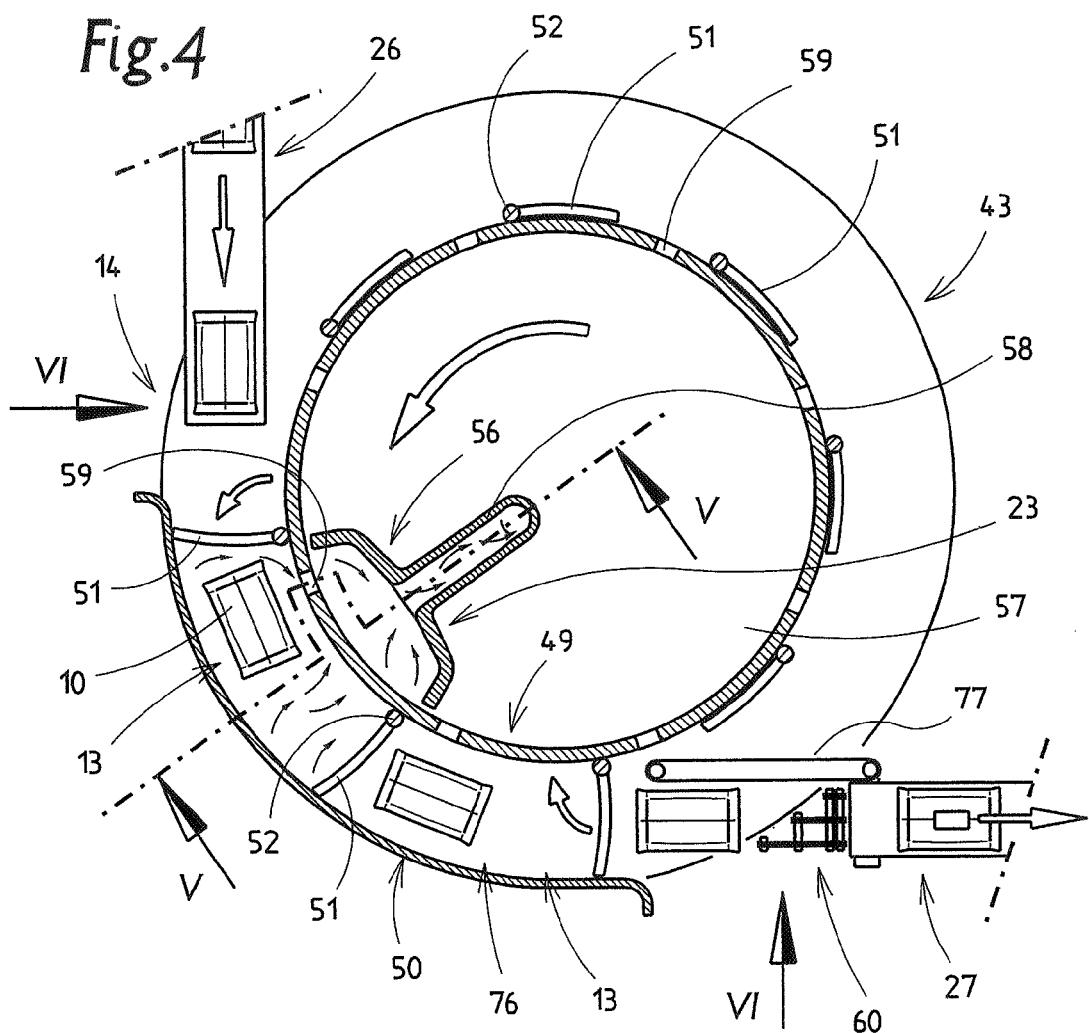
Figure 5:
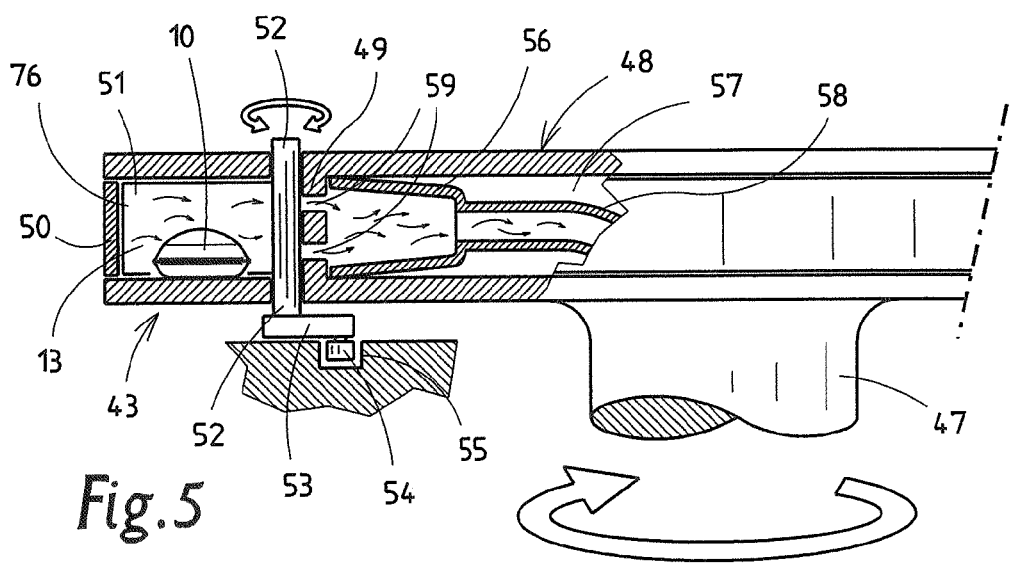
Figure 6:
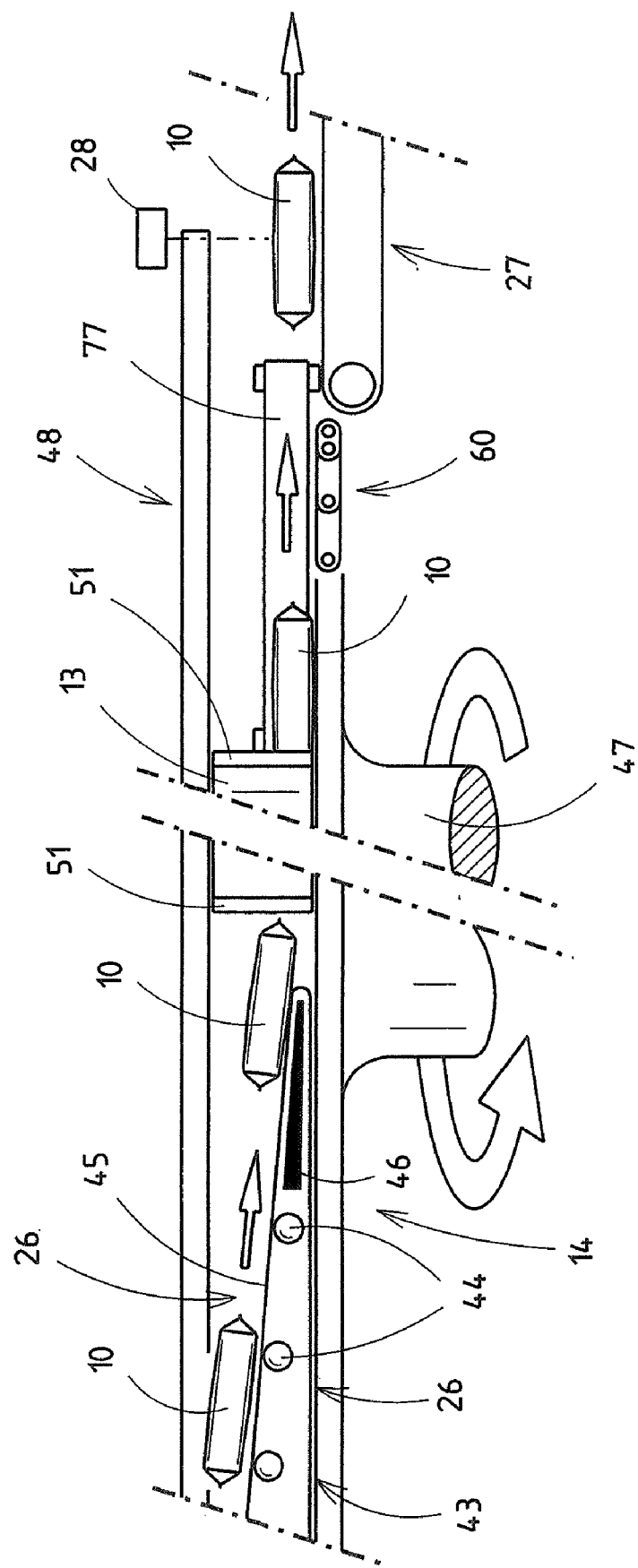

Exemplary embodiments of the devices will be explained below by using the drawings, in which:

FIG. 1 shows a device for testing the integrity of (cup) packages in a schematic side view, FIG. 2 shows a detail II from FIG. 1 on an enlarged scale, FIG. 3 shows a plan view of part of the device according to FIG. 1 in accordance with arrow III on an enlarged scale, FIG. 4 shows another exemplary embodiment of the device in plan view and in horizontal section, FIG. 5 shows the device according to FIG. 4 in a transverse or radial section corresponding to the section plane V-V in FIG. 4, FIG. 6 shows a side view of the device according to FIG. 4 corresponding to the arrows VI-VI, FIG. 7 shows a further exemplary embodiment of the device in plan view and in horizontal section, FIG. 8 shows a detail of the device according to FIG. 7 in the radial section plane VII-VII from FIG. 7, FIG. 9 shows a fourth exemplary embodiment of the device in plan view and in horizontal section, FIG. 10 shows the device according to FIG. 9 in a circumferential section and in a side view corresponding to section plane X-X in FIG. 9.

The exemplary embodiments relate to the testing of packages 10, 11 having at least one easily deformable subregion made of film or the like. The particular exemplary embodiment according to FIG. 1 to FIG. 3 deals with the testing of cups (11) having an upper deformable closing film 12. All the packages are closed tightly and, in addition to the packaged goods, contain a proportion of air or gas as package content.

The packs 10, 11 are tested for integrity, specifically by means of the vacuum, during the transport following fabrication. For this purpose, during a conveying section the packages 10, 11 are transported in a closed, largely sealed testing chamber 13, to which vacuum is applied for at least some time. In this way, deformation of the package results, namely cushion-like inflation in the case of a bag 10 and an outwardly directed curvature of a closing film 12 in the case of the cups 11. This deformation is sensed in order to generate a fault signal and to separate out the faulty package detected as non-sealed.

One special feature is that the vacuum is produced with the aid of conveying elements for the packages. In the exemplary embodiment according to FIG. 1 to FIG. 3, the cups 11 are transported by a package conveyor 14 which is constructed as an endless conveyor, specifically as a plate conveyor. The package conveyor 14 is led over deflection rolls 15, 16.

An upper conveying run 17 of the package conveyor 14 forms the testing section. In its region, an in particular large number of packages or cups 11 is tested during the continuous conveying movement of the package conveyor 14. A selected number of cups 11 forms a testing group 18 which, during the testing, is enclosed by a (common) covering hood 19 in order to form the testing chamber 13.

The packages or cups 11 are transferred to the package conveyor 14 by a feed conveyor 20. The cups 11 arriving in an ordered formation on an endless conveyor or belt are gripped by a lifting conveyor 21 having suction heads 22 for one cup 11 in each case and are placed on the conveying run 17 by means of an appropriate movement of the lifting conveyor 21. Provision is made for one sub-group of cups 11 to be gripped with each conveying stroke. In the present case, this group comprises two transverse rows 23 of aligned cups 11. The (two) transverse rows 23 gripped at the same time, together with cups 11 or transverse rows 23 already present, form a testing group 18. In the present example, the latter comprises six transverse rows 23 but can quite possibly comprise a larger number of cups 11. Each transverse row 23 in this case has five cups 11 located beside one another.

The testing chamber 13 or the covering hood 19 corresponds to the dimensions of the testing group 18 aligned in ordered formation. The covering hood 19 comprises a transversely oriented or horizontal upper wall 24 and upright side walls 25 running all around. The latter are supported in a sealing manner on the package conveyor 14 or its upper run 17, so that a hollow chamber closed overall is produced as testing chamber 13. Transverse webs 26 can be fitted within the covering hood 19. These extend between transverse rows 23 and likewise rest in a sealing manner on the package conveyor 14. The height of the transverse webs 26 is lower than the overall height of the covering hood 19, so that a coherent interior is produced.

The package conveyor 14 is constructed in such a way that a dimensionally stable, flat surface is formed, at least in the region of the testing section. This is achieved by means of a plate conveyor or plate chain as package conveyor 14. Dimensionally stable plates 27 are arranged on an endless pulling element and, in the region of the conveying run 17, form a continuous plate plane as a support for the cups 11 and the covering hood 19. The covering hood 19 is positioned on the conveying run 17 in such a way that the transversely oriented side walls 25 and the transverse webs 26 rest on the package conveyor 14 in the region of joints 30 between the plates 27, and thus seal off the joints 30.

In the region of the testing chamber 13 or the covering hood 19, each package or each cup 11 is assigned a sensor 28 for testing the cup 11. The number of sensors 28 corresponding to a testing group 18 is arranged outside the testing chamber 13, specifically on the upper wall 24 of the covering hood 19, in each case above the cup 11 to be tested, so that its closure film 12 is scanned. In the case of correctly, that is to say tightly, formed cups 11, the result is a curvature of the closing film 12. In the case of a non-sealed cup 11, the closure film 12 remains in a flat form (FIG. 2). This shape of part of the package, specifically the closure film 12, is scanned by testing beams from the sensors 28, in particular by laser beams. These are evaluated in accordance with the triangulation principle. A faulty package or a faulty cup 11 is identified and separated out later. Overall or in the region of the sensors (28), the upper wall 24 consists of transparent material (acrylate).

In the testing chamber or in the covering hood 19, a vacuum is produced during the testing phase. The covering hood 19 or its upper wall 24 has an upright suction pipe 31. This is connected to a stationary vacuum source 33 via a flexible connecting piece, specifically via a hose 30.

The covering hood 19 can be moved by a hood conveyor 29. The rigid suction pipe 31 is at the same time a carrying element for the covering hood 19 and is connected to a carriage 34 of a horizontal linear drive 35 acting in the conveying direction. Said linear drive 35 is a servo axle, in particular a spindle driven in rotation, on which the carriage 34 can be displaced by a spindle nut. The linear drive 35 or the spindle is driven by a servomotor 36, which permits exact movements and relative positions of the covering hood 19.

The covering hood 19 can be moved up and down, specifically between the testing position shown and a position raised off the package conveyor 14, in which the coupling hood 19 is located above the movement path of the packages or cups 11. In this raised position, a return movement into the initial position shown in FIG. 1 takes place. A lifting device for the coupling hood 19, specifically for the suction pipe 31, is arranged in the region of the carriage 34 and, for example, comprises an (upright) rack and pinion. The movement path of the covering hood 19 is shown in an idealized manner as a dash-dotted line 37 in FIG. 1.

In the raised position of the covering hood 19, the tested cups 11 leave the testing section (line 37). The packages 11 identified as faulty are taken off the package conveyor 14. In the region of the gaps produced in the formation of the cups 11, a correctly formed cup 11 is set down in the exact position. This makes it possible to transfer complete ordered formations having only correct cups 11 to an output conveyor 38. The latter is assigned a lifting conveyor 39, which is constructed in the same way as the lifting conveyor 21 in the region of the feed conveyor 20. The lifting conveyer 39 picks up sub-groups from the package conveyor 14, namely in particular two transverse rows 23 of the packages in each case, and sets them down on the output conveyor 38 constructed as a belt.

In order to remove faulty packages or cups 11, a transversely oriented conveyor 40 is arranged above the package conveyor 14. This comprises a belt conveyor and a lifting conveyor 41 having suction heads 22, which are arranged on a common carrying arm 42 in relative positions corresponding to the formation of the cups 11 and the spacing within a transverse row 23. Said carrying arm 42 is lowered with the suction heads 22 onto the relevant transverse row 23. On the basis of controlled feeding of vacuum, only the faulty cup 11 is gripped, raised and set down on the conveyor 40.

The gap produced as a result is subsequently filled in the region of a further transversely oriented filling conveyor 78. This is constructed in the same or analogous way as the conveyor 40. On the former, a number or a row of tested, sealed containers 11 is kept ready. By means of the controlled application of the suction heads 22, in each case a cup 11 is gripped by the lifting conveyor 41 and set down on the package conveyor 14 in the region of the gap.

The conveyors 40, 78 can alternatively be constructed in such a way that, for example by means of controllable jibs, in each case individual cups 11 are conveyed for removal or filling.

In the exemplary embodiment according to FIG. 4 and FIG. 5, the package conveyor 14 is constructed as a (continuously) rotating conveying disk 43. The packages, namely bags 10, are transported by the pilot conveyor 26 onto a strip-like or ring-like edge region of the conveyor disk 43 and deposited there, so that the bags 10 are transported with a circumferential spacing from one another along a curved conveying section—in the present case somewhat less than a semicircle. The pilot conveyor 26 is constructed as a belt conveyor having a number of supporting rollers 44 underneath an upper conveying run 45. The latter is oriented obliquely downward toward the conveyor disk 43. A deflection part 46 of the pilot conveyor 26 is wedge-shaped, running out to a sharp edge, so that the bags 10 are deposited in a fault-free manner on the conveyor disk 43. The latter can be driven by an upright shaft 47.

A curved subregion of the conveyor section of the bags 10 is constructed as a closed (curved) testing channel 76. The latter is delimited at the top by a mating disk 48, which forms a (rotating) unit with the conveyor disk 43. Located immediately on the inside there is a circular inner wall 49 running all around as a (upright) limit of the conveyor or testing channel 76. On the outside, the latter is delimited by a guide plate 50 which is stationary and in a fixed location. The latter follows the contour of the conveyor disk 43 and is positioned between outer edges of the conveyor disk 43 and mating disk 48. The inner wall 49 is simultaneously the connection between the conveyor disk 43 and the mating disk 48.

In the region of the testing channel 76 formed in this way, closed testing chambers 13 are formed by dividing elements oriented transversely or approximately radially, specifically flap-like dividing walls 51. In the initial position, these bear on the outside of the cross section of the testing channel, specifically on the inner wall 49. For a form-fitting, exact contact, the dividing walls 51 are curved appropriately. Each dividing wall 51 can be pivoted, specifically by being fitted to an upright pivoting shaft 52. The latter is rotated in one direction and the other, specifically from an initial position of the dividing wall 51 on the inner wall 49 into a transversely oriented active dividing position. For this purpose, each pivoting shaft 52 is connected to a gear mechanism outside the testing channel 76, in the present case to a swinging arm 53, which is moved by a cam roller 54 on a curved path 55 which runs all around in a fixed location with regard to the pivoting movements.

Following the deposition of a bag 10 on the conveyor disk 43, following the bag 10 the relevant dividing wall 51 is pivoted into the dividing or sealing position, specifically filling the cross section of the testing channel 76. With the dividing walls 51 positioned in front of and behind the bag 10 and with the remaining wall parts, a testing chamber 13 that is closed all round is formed. This has a vacuum applied to it by a suction unit 23 in a fixed location.

The suction unit 23 is formed as a suction bell 56 and is arranged in an internal space 57 formed between the disks 43, 48 and delimited by the inner wall 49. The suction bell 56 is adjoined by a radially oriented suction pipe 58, which is connected to a central vacuum source.

The (upright) inner wall 49 has air-permeable regions, suction holes 59 in the present case, which are moved past the open side of the suction bell 56 during the rotation of the unit. At least one suction hole 59 is assigned to a testing chamber 13, so that, during the movement of the suction holes 59 in the region of the suction bell 56, a vacuum is produced in the testing chamber 13.

At the end of the conveying or testing channel, the dividing wall 51 in each case positioned in front of a bag 10 in the conveying direction is moved back into the initial position. The tested bag 10 is then deflected by a lateral conveyor 77 from the conveyor disk 43 onto an output conveyor 27. The region between conveyor disk 43 and output conveyor 27 is filled by a bridge conveyor 60.

The scanning of the tested packages or bags 10 is also carried out here by a sensor 28 in the region of the output conveyor 27.

Also in the exemplary embodiment according to FIG. 7 and FIG. 8, the packages, specifically cups 11, are transported along a testing section in the form of a circular arc in a closed testing channel 76. The latter is dimensioned approximately in the form of a quarter of a circle. The cups 11 are set down for this purpose on a support in the form of a part-circle, specifically a package conveyor 14 constructed as a belt conveyor. The latter is constructed in a manner known in principle such that the conveying run 17 has a contour in the form of a circular arc, approximately in the form of a quarter circle. A lower run 61 runs to some extent oriented obliquely (FIG. 8).

The packages or cups 11 are transported on the pilot conveyor 26 at a distance from one another and are set down on the conveying run 17 the package of 14. In the region of the testing channel 76, specifically on the package conveyor 14, the cups 11 are introduced into testing chambers 13. These also formed here by limits which are stationary and run with them. An external guide, specifically a guide plate 50, is arranged in a fixed location, following the contour in the form of a circular arc of the package conveyor 14. Above the conveying run 17 of the package conveyor 14, radially oriented webs are inserted as transverse walls 62 at distances from one another. These are arranged at uniform distances from one another and, in the region of the guide plate 50, bear on the latter in a sealing manner. At the ends of the wedge-like transverse walls 62, there are arranged resilient sealing strips 63 for this purpose which, during the movement of the transverse walls 62, bear in a sliding manner on the guide plate 50.

The transverse walls 62 are constructed as radially projecting webs of a rotating body 64. The latter extends over the height of the testing channel 76 to be formed. An inner surface 65 of the rotating body 64 in the shape of a circular arc forms the inner limit of the testing chamber 13. The upper termination provided is an upper wall 67 which can be arranged in a fixed location but, in the present case, is constructed as a part of the rotating body 64 running all around. The outer limit provided is a guide plate 50 arranged in a fixed location, which follows in the form of a quarter circle the contour of the package conveyor 14 in the region of the conveying run 17. In the example shown (FIG. 8), the guide plate 50 is arranged between the upper wall 67 and the conveying run 17.

Accordingly, the testing channel 76 is constructed approximately in the form of a quarter circle. the transverse walls 62 arranged on the rotating body 64 pass through the testing channel 76, forming a testing chamber 13 in each case. The movements are coordinated with one another in such a way that the transverse walls 62 in the region of the pilot conveyor 76 enter the interspace between successive packages or cups 11 and then move through the testing channel 76 in this relative position.

The belt of the package conveyor 14 is provided with groups of suction heads 21 in order to form suction regions 22, in a manner similar to that in the exemplary embodiment of FIG. 1. The cups 11 are positioned on the suction regions 22. The vacuum in the respective testing chamber 13 is produced by a suction unit 23, which here comprises a suction duct 66 under the conveying run 17. This suction duct 66 opens approximately in the central region of the testing channel 76 on the underside of the conveying run 17, so that a vacuum is produced in the testing chamber 13. The suction duct 66 is provided with supporting ribs 68 in a plane underneath the conveying run 17 in order to support the same during the transfer of the vacuum.

The monitoring of the tested cups 11, specifically the scanning of the upper side or the closure film 12, is carried out here directly in the region of each testing chamber 13. In each case sensors 69, which revolve with the rotating body 64 and the upper wall 67, are fitted to the underside of the upper wall 67. The tested packages or cups 11 are transferred directly from the package conveyor 14 to the output conveyor 27 on the outlet side of the testing channel 76.

FIG. 9 and FIG. 10 show an exemplary employment in which, in a manner analogous to the exemplary embodiment according to FIG. 4, FIG. 5, testing chambers 13 are formed in the testing channel by movable, specifically pivotable, intermediate walls 70. The special feature is that the intermediate walls 70, which are like wings, are fitted to a horizontal rotary journal 71 arranged centrally. The latter is mounted in an appropriately thick-walled, rotating supporting element 72, which is functionally comparable with the inner wall 49.

Formed inside the supporting body 72 is an annular guide channel 73. The latter accommodates the elements for moving the intermediate walls 70 during the rotation of the supporting body 72. A swinging arm arranged at the end of the rotary journal 71 has a sensing roller which runs on a cam track. The movement of the intermediate walls 70 is controlled in such a way that, in the region of the pilot conveyor 26, an intermediate wall 70 located between successive packages or cups 11 is rotated through 90° from the horizontal initial position into the upright position during the movement of the supporting body 72. The horizontally oriented rotary journals 71 are arranged in a (horizontal) plane above the packages to be tested, on account of appropriate dimensions.

Each testing chamber 13 is delimited by an upper carrier or conveyor disk 43, an upper mating disk 48, by a circumferential surface 74 of the supporting body 72, by the outer guide, specifically the guide plate 50, and by two intermediate walls 70 following each other. The necessary vacuum is produced by a suction unit 23, which is constructed in the same or similar way as that in the exemplary embodiment of FIG. 4, FIG. 5 and is connected to the testing chamber 13 via suction ducts 75 in the supporting body 72.

The sensors 69 in this exemplary embodiment are assigned directly to each testing chamber 13 and, for this purpose, are arranged on a movable part, specifically here on the upper mating disk 48. A further alternative is possible to the effect that sensors are used which react to other physical or chemical changes. For example, the sensors can be formed as odor sensors, which detect odor particles from the content of the package emerging as a result of the vacuum.

LIST OF DESIGNATIONS

10 Bag
11 Cup
12 Closing film
13 Testing chamber
14 Package conveyor
15 Deflection roll
16 Deflection roll
17 Conveying run
18 Testing group
19 Covering hood
20 Feed conveyor
21 Lifting conveyor
22 Suction head
23 Transverse row
24 Upper wall
25 Side wall
26 Transverse web
27 Plate
28 Sensor
29 Hood conveyor
30 Joint
31 Suction pipe
32 Hose
33 Vacuum source
34 Carriage
35 Linear drive
36 Servomotor
37 Line
38 Output conveyor
39 Lifting conveyor
40 Conveyor
41 Lifting conveyor
42 Carrier arm
43 Conveyor disk
44 Supporting rollers
45 Conveying run
47 Shaft
48 Mating disk
49 Inner wall
50 Guide plate
51 Dividing wall
52 Pivoting shaft
53 Swinging arm
54 Cam roller
55 Curved path
56 Suction bell
57 Internal space
58 Suction pipe
59 Suction hole
60 Bridge conveyor
61 Lower run
62 Transverse wall
63 Sealing strip
64 Rotating body
65 Inner surface
66 Suction duct
67 Upper wall
68 Supporting rib
69 Sensor
70 Intermediate wall
71 Rotary journal
72 Supporting body
73 Guide channel
74 Circumferential surface
75 Suction duct
76 Testing channel
77 Lateral conveyor
78 Filling conveyor

The invention claimed is:

1. A method for testing the integrity of packages, formed as closed hollow bodies having air inside the same, by means of vacuum, the packages (10, 11) being transported continuously along a conveying path, and, during a transport section, the packages (10, 11) being accommodated in a testing chamber (13) running along with the packages (10, 11) or with a group of the same to be tested, and the testing chamber (13) having a vacuum applied to it in a region of a defined testing section or testing station, and the testing chamber (13) being sealed off on all sides, in conjunction with a package conveyor (14), and any deformations of the packages (10, 11) being scanned in the testing chamber (13) and/or after leaving the same, characterized in that the package conveyor (14), configured as a plate conveyor, has dimensionally stable plates (27), which form a continuous plate plane as a support for the packages and a sealing element, namely a covering hood (19), and the sealing element for sealing being positioned on the package conveyor (14) in such a manner that transversely oriented side walls (25) and transverse webs (26) of the sealing element rest on the package conveyor (14) in a region of joints (30) between the plates (27) for sealing off the joints (30).

2. The method as claimed in claim 1, characterized by the following features:
   a) a formed group of packages (10, 11), namely a testing group (18) comprising longitudinal rows and transverse rows (23) of packages (11) is checked simultaneously in the testing chamber (13) during transport,
   b) each package (10, 11) is checked by an associated testing element or a sensor (28),
   c) faulty or non-sealed packages (10, 11) are identified and separated out of the testing group (18),
   d) in the place of the faulty package (10, 11) separated out, an intact, sealed package (10, 11) is positioned at the same position within the testing group (18).

3. A device for testing the integrity of packages formed as closed hollow bodies having air inside the same in a testing chamber (13) having a vacuum applied to it, the packages (10, 11) having a vacuum applied to them during their continuous transport in the testing chamber (13) running along with the packages (10, 11) in a direction of transport, and the packages (10, 11) being arranged on a package conveyor (14) and transportable by the latter along a testing section or a testing station, and in a region of the testing section or testing station, there is moved into a testing position at least one sealing element which, in conjunction with the package conveyor (14) and/or further limits, forms the closed testing chamber (13), the testing chamber (13) having a vacuum applied to it for some time, specifically in a region of the testing section or testing station, and the packages (10, 11) are checked, either within the testing chamber (13) or after leaving the same, by sensors (28) with respect to correct formation, characterized in that the package conveyor (14) is configured as a plate conveyor with dimensionally stable plates (27), which form a continuous plate plane as a support for the packages and the sealing element, namely a covering hood (19), and the sealing element being positioned on the package conveyor (14) in such a manner that transversely oriented side walls (25) and transverse webs (26) of the sealing element rest on the package conveyor (14) in a region of joints (30) between the plates (27) for sealing off the joints (30).

4. The device as claimed in claim 3, characterized in that the testing chamber (13) is delimited by the package conveyor (14) and the covering hood (18) which is placed on the package conveyor (14) in a sealing manner, the covering hood (18) being connected to a vacuum source (33) via a suction line (32) or a suction pipe (31).

5. The device as claimed in claim 4, characterized in that each package (10, 11) can be registered with respect to a shape change in a region of the testing chamber (13), by means of sensors (28) arranged outside the covering hood (18), namely laser sensors operating in accordance with a triangulation principle and arranged above a translucent or clear-view upper wall (24) of the covering hood (18) corresponding to the formation of the packages (10, 11).

6. The device as claimed in claim 4, characterized in that, outside a region of the testing chamber (13), packages (10, 11) identified as faulty are conveyed away from the formation of the testing group (18) by a conveyor, are replaced by a correct, intact package (10, 11) by means of a filling conveyor (78).

7. The device as claimed in claim 4, characterized in that an element delimiting the testing chamber (13), namely the package conveyor (14) and/or a lateral limit, is movable at a conveying speed of the packages (10, 11) to be tested and has air-permeable suction regions (22) which are each assigned to a package (10, 11) and are movable past at least one suction unit (23), arranged in a fixed location, in order to produce a temporary vacuum in the testing chamber (13).

8. The device as claimed in claim 4, characterized in that the testing chamber (13) is formed in the region of a testing channel (76), the testing channel (76) being delimited by the package conveyor (14) and by side and upper walls, and the testing chambers (13) are delimited by movable, transversely oriented dividing elements within the testing channel (76), in particular by dividing walls (51) or transverse walls (62) or intermediate walls (70) that can be moved with the package conveyor (14).

9. The device as claimed in claim 4, characterized in that the package conveyor (14) is constructed as a rotationally driven conveying disk (43), on which the packages (10, 11) can be conveyed along part of a circle, a testing channel (76) being delimited laterally by an inner wall (49) or a circular supporting element (72), radially on the outside by a preferably stationary guide plate (50), on the upper side by a mating disk (48) or upper wall (67), and testing chambers (13) within the part-circular testing channel (76) being delimited by movable dividing walls (51) or transverse walls (62) or intermediate walls (70).

10. The device as claimed in claim 9, characterized in that, in order to delimit the testing chambers (13) transversely in the region of the testing channel (76), dividing walls (51) or intermediate walls (70) are designed to be pivotable, specifically are in particular connected to a pivoting shaft (52) or a rotary journal (71) that can be rotated under control, in order to move the dividing walls (51) or intermediate walls (70) in the region of the testing channel (76) from an initial position pointing approximately in the circumferential direction into a sealing transverse position.

11. The device as claimed in claim 4, characterized in that the suction unit (23), in particular a suction bell (56), is arranged in an internal space (57), and the circular inner wall (49) or the supporting element (72) of each testing chamber (13) has associated openings or suction holes (59) or suction ducts (75), which can be moved past the fixed-location suction unit (23) by means of rotation of the conveyor disk (43) or the inner wall (49) or supporting element (73).

12. The device as claimed in claim 4, characterized in that the package conveyor (14) constructed as a belt is guided in a curve, in particular in the shape of a quarter-circle, transverse limits for a quarter-circular testing channel (76) being radially oriented transverse walls (62), which are fitted to a rotating body (64) in the manner of a star and can be introduced into the testing channel (76) one after another as a result of movement of the rotating body (64), forming testing chambers (13).

13. The device as claimed in claim 12, characterized in that the testing channel (76) is delimited by the curved, in particular quarter-circular, package conveyor (14) having suction regions (22), by an inner surface (65) of the rotating body (64), by an external, stationary guide plate (50) and on the upper side by an upper wall (67) preferably connected to the rotating body (64).

14. The device as claimed in claim 3, characterized in that, at least in a region of a conveying run (17) for accommodating the packages (10, 11), the package conveyor (14) forms a flat supporting surface for the packages (10, 11) which is pressure-loaded.

15. The device as claimed in claim 3, characterized in that the covering hood (18) is movable up and down by a hood conveyor (29) and also is movable to and fro in the direction of movement of the package conveyor (14).

16. The device as claimed in claim 15, characterized in that the covering hood (18) is fitted with an upright suction pipe (31) that is movable up and down on a linear drive (35) running parallel to the package conveyor (14), by means of a carriage (34) on a horizontal servo axle.

* * * * *